United States Patent [19]

Smith et al.

[11] Patent Number: 4,648,502

[45] Date of Patent: Mar. 10, 1987

[54] TRANSPORT CONVEYOR FOR CONICAL OBJECT

[75] Inventors: Alan Smith, Accrington; Bhupendra Patel, Brierfield, both of England

[73] Assignee: 501 Hollingsworth (U.K.) Ltd., Lancashire, England

[21] Appl. No.: 743,538

[22] Filed: Jun. 11, 1985

[30] Foreign Application Priority Data

Jun. 13, 1984 [GB] United Kingdom ............... 8415002

[51] Int. Cl.⁴ .......................................... B65G 47/24
[52] U.S. Cl. .................................. 198/399; 198/534; 193/32
[58] Field of Search ............... 198/374, 400, 415, 394, 198/398, 399, 534; 193/32, 40

[56] References Cited

U.S. PATENT DOCUMENTS

| 3,031,059 | 4/1962 | Ingham, Jr. ........................ 198/398 |
| 3,276,565 | 10/1966 | Oman ................................ 198/394 |
| 3,328,948 | 7/1967 | Du Buis et al. ..................... 198/400 |

FOREIGN PATENT DOCUMENTS

80/00020 1/1980 World Int. Prop. O. .......... 198/382

Primary Examiner—Joseph E. Valenza
Assistant Examiner—Kyle E. Shane
Attorney, Agent, or Firm—Cort Flint

[57] ABSTRACT

A transport conveyor for empty conical winding tubes includes a recirculating band system to drive jammed tubes for rotation in a direction causing them to remain mutually parallel along the chute of the conveyor. Every alternate tube is reversed by means of a holding pin and a rotating shoe. A fin upstanding from the conveyor floor supports all the tubes with their axes parallel.

12 Claims, 2 Drawing Figures

TRANSPORT CONVEYOR FOR CONICAL OBJECT

FIELD OF THE INVENTION

The present invention relates to textile apparatus including a conveyor for conical objects, such as support cores on which conical yarn packages are to be spun.

PRIOR ART

Conveyors are already known for feeding conical support tubes to a location of use. For example in Japanese Kokai No. 59-157335 the conveyor consists of a belt having a plurality of upstanding ribs to define discrete pockets to separate one sucn conical object from the next. The conical objects in question have their wider ends at one side of the belt and their narrow ends at the opposite side of the belt.

It is also known to roll oojects, for example cylindrical plastic ampoules, down an inclined chute (see British Pat. No. 1,106,844) and to unstick them at the entrance end of the chute by virtue of the rolling imparted by the belt to free a single ampoule to roll freely down the chute to a delivery end thereof.

It is also known, from British Pat. No. 2,589,966, to employ a curtain of endless chains which drapes onto the downstream end of an inclined chute for maintaining movement of material to a crusher by contacting the top of the material supported on the bottom of the feed chute.

OBJECTS OF THE INVENTION

It is an object of the present invention to provide a conveyor for guiding conical objects to a location of use, by rolling them in a continuous stream down a chute.

It is a further object of the invention to provide a conveyor in which the number of conical objects in transit at any one time is as high as possible in order to allow the conveyor to function as a reservoir for the conical objects.

It is a further object of the invention to enhance the storage capacity of a conveyor by alternating the orientation of tne conical objects and allowing them to contact one another, but without jamming on the chute.

BRIEF DESCRIPTION OF THE DRAWINGS

In order that the present invention may more readily be understood the following description is given, merely by way of example, with reference to the accompanying drawings in which.

DESCRIPTION OF THE PREFERRED EMBODIMENT

Figure 1:
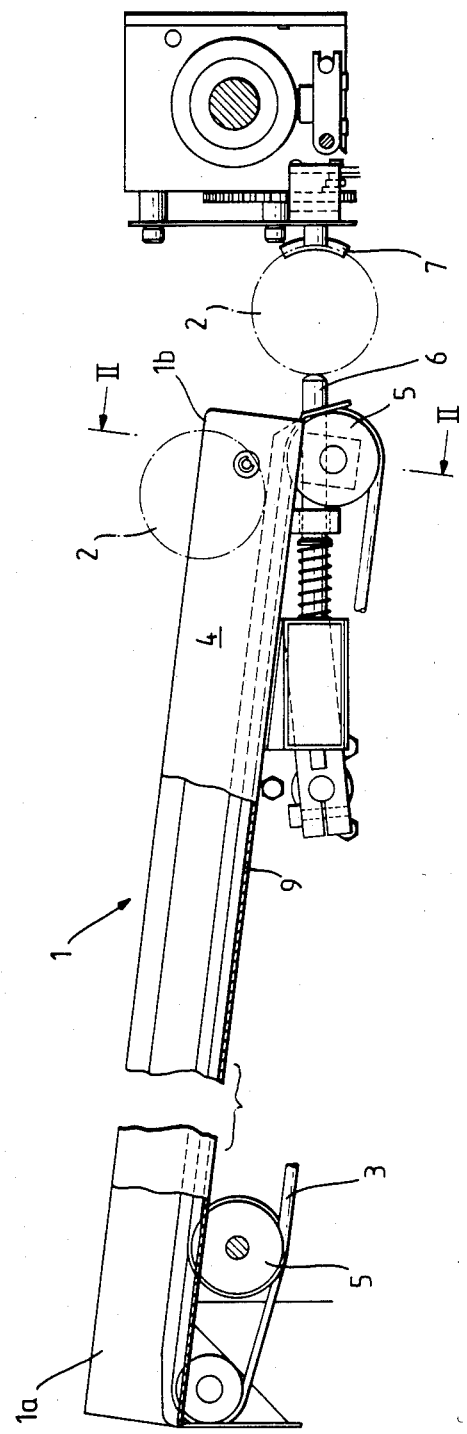
FIG. 1 is a side elevational view of a conveyor for transporting empty conical yarn winding tubes for an open-end spinning machine.
Figure 2:
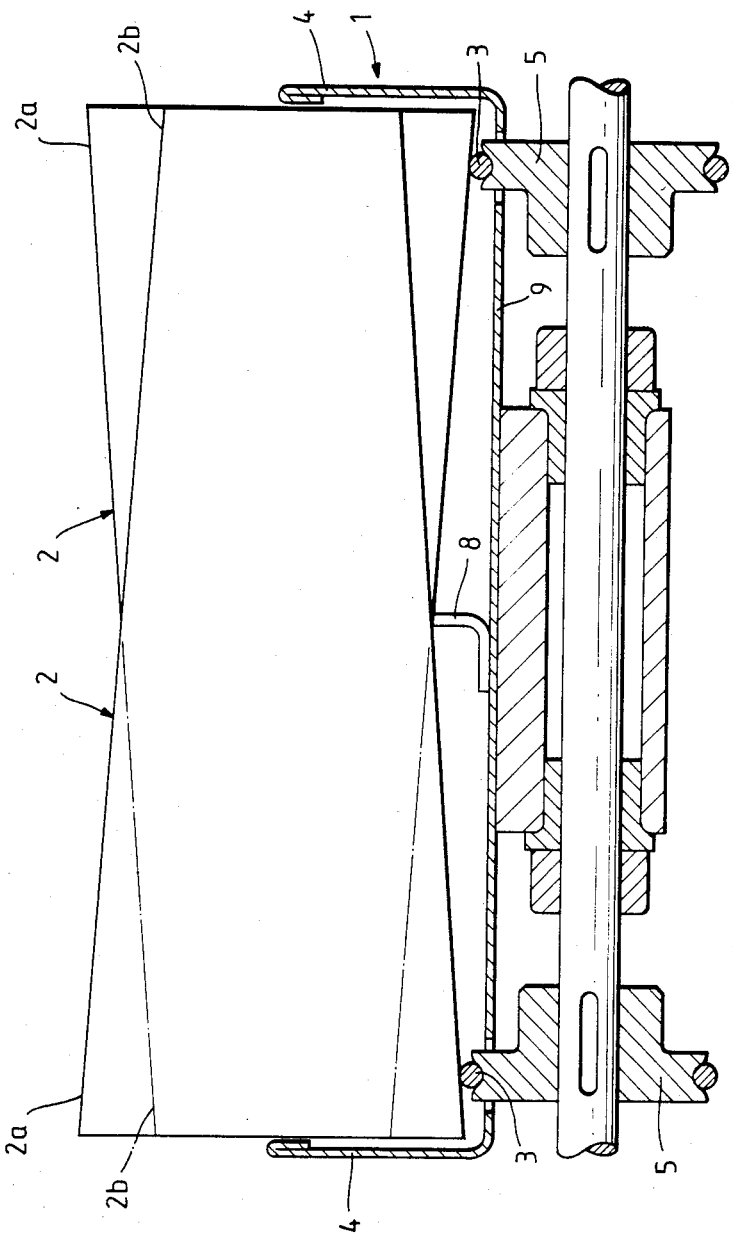
FIG. 2 is a sectional view taken on tne line II—II of FIG. 1.

FIGS. 1 and 2 show a tube transport conveyor chute 1 which receives empty winding cores at the receiving end 1a and transports them along a shallowly downwardly inclined path towards the delivery end 1b of the transport conveyor chute.

The tubes 2 are conical and need to be arranged in alternating orientation so that the centre lines of tne tubes are substantially parallel to one another; in other words the narrow end 2b of every other tube 2 will be to one side of the conveyor chute 1 and the narrow end 2b of each intervening tube is to the opposite side as shown in FIG. 2. Since conical tubes will not roll down the chute 1 in a straight line, it will be necessary to ensure that the tubes retain their orientation with their axes of rotation mutually parallel otherwise they will tend to jam on the conveyor chute 1. According to the present invention this is achieved by swivelling the tubes 2 round to move their larger diameter ends up the chute 1 so they will not jam-up against the side walls of the conveyor and preferably this is achieved by virtue of two endless bands 3 which are each arranged adjacent to a respective side wall 4 of the tube transport chute and consequently engage frictionally with the larger diameter ends 2a of conical tubes passing along the chute. The endless bands 3 are supported on pulleys 5 and are driven for circulation in a direction such that the upper run moves counter-current to the direction of movement of yarn winding tubes from the receiving end 1a to the delivery end 1b of the transport conveyor, and this causes the tubes 2 to swivel in the appropriate direction.

There is therefore no likelihood of jamming of the conical tubes 2 as they move along the shallowly inclined conveyor chute.

When the tubes arrive at the delivery end 1b of the conveyor they roll off the conveyor and enter a space between a solenoid-driven retractable holding pin 6 and a driven rotatable shoe 7.

Before the tubes can be fed to a winder to receive a yarn package, it is necessary to ensure that they all have the same orientation. Thus every other tube needs to be reversed.

Inversion of a tube is carried out by extending the holding pin 6 into the position shown in FIG. 1 where it holds a tube 2 against the rotatable shoe 7.

If the holding pin 6 remains retracted, there will be no influence to invert the tube 2 and it will simply fall off the end of the conveyor chute to a position which will in any case have been occupied by a preceding tube which has just been reversed by means of the rotatable shoe 7.

Just before the tube arrives at this position (not shown), a previously fed tube 2 has been carried onward for winding.

As can be seen from FIG. 2, the axes of the empty tubes 2 are kept parallel to one another and to the floor 9 of the chute by means of a central longitudinal fin 8 upstanding from the floor of the chute and supporting each tube 2 midway along its length.

The conveyor described above may, for example, be incorporated in a doffer robot for an open-end spinning machine.

We claim:

1. In textile apparatus including a conveyor for transporting a plurality of conical winding tubes to a point of use, the improvement wherein said conveyor comprises: (a) an inclined chute having a stationary floor extending between a receiving end and a delivery end and arranged for supporting and guiding a succession of the conical tubes between said receiving and delivery ends of the chute with alternating orientation of successive tubes along the chute; (b) first and second friction means above the floor and laterally spaced with respect to the chute center line on respective opposite sides thereof; and (c) means driving said first and second friction means to move along the chute in a direction from the delivery end to the receiving end thereof, each of said first and second friction means having a friction surface to engage and to swivel the conical tubes on the chute for rotating such tubes to cause them to remain mutally parallel as they roll along the chute towards the delivery end.

2. Apparatus according to claim 1, wherein said first and second friction means for swivelling the conical objects along the transport conveyor chute each comprise; (i) an endless friction band and (ii) respective pulleys at the receiving end and the delivery end of the transport chute, said endless bands being entrained about said respective pulleys and positioned to be able to engage larger diameter ends of conical tubes on the transport conveyor chute.

3. Apparatus according to claim 1, and including means for reversing every second said conical tube delivered by the tube transport conveyor.

4. Apparatus according to claim 3, wherein said reversing means comprise a rotatable shoe mounted for rotation about an axis perpendicular to the axis of symmetry of a said conical tube carried by the conveyor; means for holding said conical tubes in contact with said rotatable shoe; and means actuating said tube holding means to hold only every second said conical tube leaving the chute for contact with said rotatable shoe.

5. Apparatus according to claim 4, wherein said means for holding a conical tube against said rotatable shoe comprise a holding pin driven for movement towards and away from said shoe.

6. Apparatus according to claim 2, and including an upstanding support fin extending along the floor of the chute to maintain the axis of symmetry of each conical tube parallel to the chute floor.

7. Textile apparatus including a conveyor for transporting a plurality of conical winding tubes to a point of use, the inprovement wherein said conveyor comprises: (a) an inclined chute having a receiving end and a delivery end, a stationary floor and stationary walls for guiding a succession of the conical tubes between said receiving and delivery ends of the chute with alternating orientation of successive tubes along the chute; (b) first and second friction means above said floor and alternately spaced with respect to the chute center line on respective opposite sides thereof; (c) elongate support means above said floor and extending between said receiving and delivery ends for supporting said conical winding tubes with their axes of rotation parallel to one another; and (d) means driving said first and second friction means to move along the chute in a direction from the delivery end to the receiving end thereof, each of said first and second friction means having a friction surface to engage the conical winding tubes only between said elongate support means and the wider ends thereof and to swivel the conical tubes on the chute for rotating such tubes to cause them to remain mutually parallel as they roll along the chute towards the delivery end.

8. Apparatus according to claim 7, wherein said first and second friction means for swivelling the conical objects along the transport conveyor chute each comprise; (i) endless friction band and (ii) respective pulleys at the receiving end and the delivery end of the transport chute, said endless bands being entrained about said respective pulleys and positioned to be able to engage larger diameter ends of conical tubes on the transport conveyor chute.

9. Apparatus according to claim 7, and including means for reversing every second said conical tube delivered by the tube transport conveyor.

10. Apparatus according to claim 7, wherein said reversing means comprise a rotatable shoe mounted for rotation about an axis perpendicular to the axis of symmetry of a said conical tube carried by the conveyor; means for holding said conical tubes in contact with said rotatable shoe; and means actuating said tube holding means to hold only every second said conical tube leaving the chute for contact with said rotatable shoe.

11. Apparatus according to claim 7, wherein said means for holding a conical tube against said rotatable shoe comprise a holding pin driven for movement towards and away from said shoe.

12. Apparatus according to claim 7, wherein said support means is an upstanding fin along the floor of the chute.

* * * * *